Inventor.
Heinrich Dueringer
Hans Ott

By Pierce, Schiffler & Parker
Attorney

United States Patent Office 3,517,251
Patented June 23, 1970

3,517,251
SYSTEM FOR STABILISING THE POSITION AND SIZE OF A RASTER SCANNED BY AN ELECTRON BEAM ON A TARGET
Heinrich Dueringer and Hans Ott, Watt-Regensdorf, Switzerland, assignors to Eidophor A.G., Glarus, Switzerland
Filed Nov. 15, 1968, Ser. No. 776,170
Claims priority, application Switzerland, Nov. 20, 1967, 16,219/67; Oct. 4, 1968, 14,831/68
Int. Cl. H01j 29/72
U.S. Cl. 315—19    9 Claims

ABSTRACT OF THE DISCLOSURE

This invention relates to a system for stabilizing the position and size of a raster scanned by an electron beam on a target and more particularly to the scanning of rasters on targets allocated to colour extracts of a multi-coloured image corresponding to the primary colours, red, green and blue. At the edge of each target, strip-like electrodes are arranged and connected to a first pulse shaper for producing line-scan pulses and frame position pulses. Second and third pulse-shapers are provided for deriving line-scan and frame reference pulses from the synchronising pulses of a video signal, and a comparator arrangement is included which compares the pulses supplied by the first pulse-shaper with those provided by the second and third pulse shapers to provide signals for controlling the circuits governing the horizontal and vertical deflection functions of the electron beam.

---

In known systems of this kind, four electrodes are arranged around the image field in the manner of a frame. Here, the pulses produced in the two side electrodes are employed to generate the line-scan positioning pulses, and the pulses produced in the bottom and top electrodes, are employed to generate the image or frame positioning pulses. The arrangement of the image or frame positioning electrodes at the top and bottom edges of the image field is open to the particular drawback that the frame positioning pulses are derived from the frame edge so that linearity errors in the image aperture, are not averaged out.

The invention seeks to avoid this drawback by having only two electrodes at the frame edges of the target which are disposed transversely of the line-scan direction. At least one of these two frame edge electrodes has a modified width over part of its length, so that in said electrode the beam results in the production of pulse groups having two different individual pulse lengths. The first pulse-shaper selects the pulse groups originating from the modified width zone of the frame edge electrode, on the basis of the significant length of their individual pulses, and in this way derives the frame positioning pulses.

Generally speaking, it is sufficient to broaden a single zone of the frame edge electrode, if said zone is located halfway up the height of the frame.

With the arrangement in accordance with the invention, the frame positioning pulses are derived from points located between the frame edges, in particular from a zone located at half the frame height. Linearity errors occurring within the frame are, therefore, averaged out.

In the known systems of the general kind with which the invention is concerned, the further processing of the positioning and reference pulses is carried out by deriving from the synchronising signals of the video signal, reference pulses the integral of which corresponds, in the stable condition, to the integral of the positioning pulses generated per line or per half frame. The comparison is carried out by integrating the opposite polarity reference and positioning pulses supplied, and at the output of the integrator, depending upon the direction of correction, a positive or negative correcting signal is produced in order to correct the raster. The formation of the correcting signals by comparison of the integrals of the positioning and reference pulses, is open to the chief drawback that control errors occur whose magnitudes are a function of random amplitude changes in the pulses. In the known devices, therefore, amplitude changes which can arise for example because of amplifier drift, must be inhibited by resorting to considerable additional outlay in circuitry.

In accordance with a preferred embodiment of the invention, the disadvantages of the known systems referred to above are avoided by providing, (a) a first pulse-shaper which forms from the pair of pulses supplied by the two frame edge electrodes with the tracing of each line, a line position pulse the length of which corresponds to the interval between the pulses of the said pair and thus to the actual line-scan time (true line-scan time) between the two electrodes, and also, with the scanning of each frame, forms a frame position pulse the length of which corresponds to the interval between the first and last pulses in the selected pulse group, (b) a second pulse-shaper which forms from line synchronising pulses of a video signal, line reference pulses whose position and length coincide with the theoretical position and theoretical time of line-scan between the frame edge electrodes, (c) a third pulse-shaper which forms from frame synchronising pulses of the video signal, frame reference pulses whose position and length coincide with the theoretical position and theoretical length of the frame position pulses, and (d) comparator devices, all in accordance with any deviations between all these position and reference pulses, form error pulses and, from these, by integration, the correcting signals for application to the line-scan and frame-scan deflection functions.

In the following, the invention will be described in greater detail making reference to an example shown in the drawings.

Figure 1:
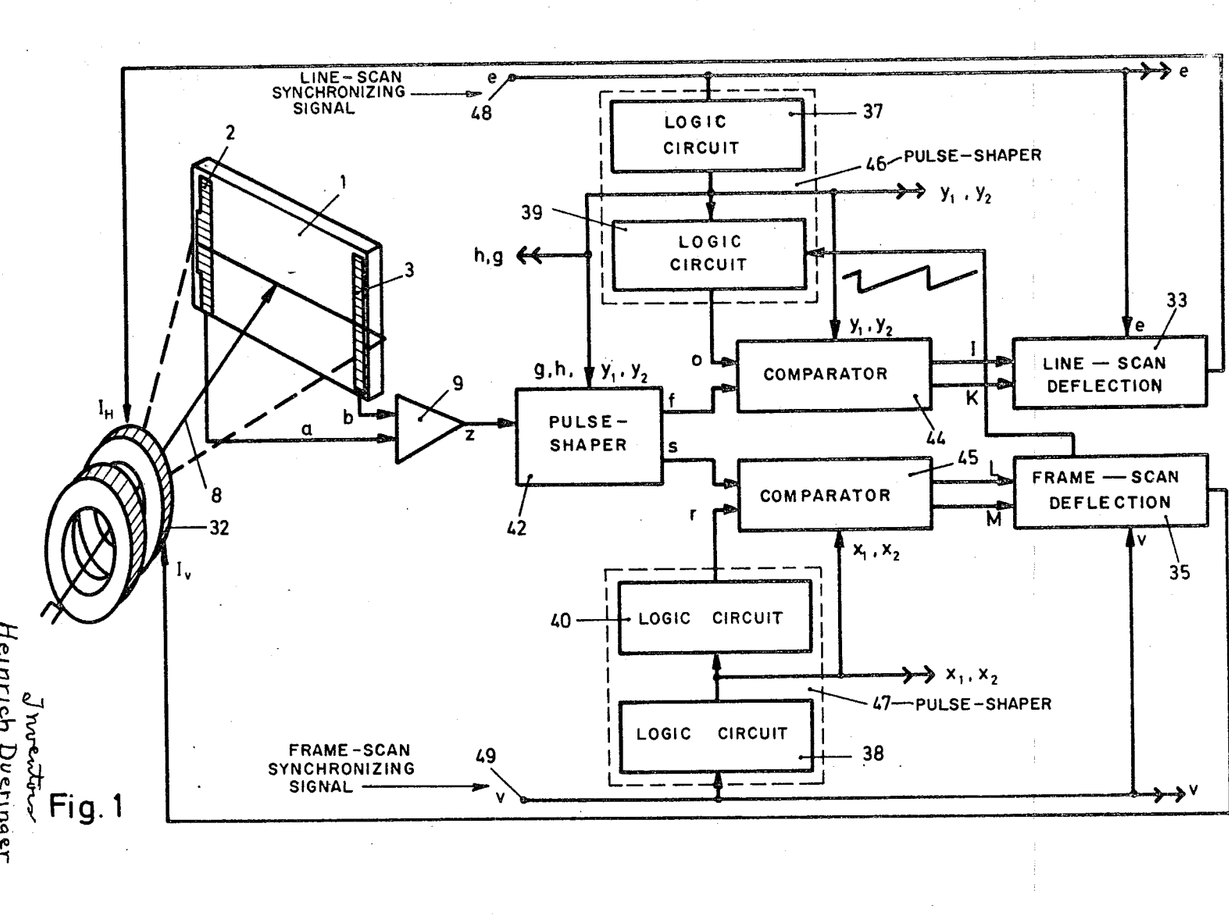
FIG. 1 is a schematic block diagram of a system in accordance with the present invention.

In FIG. 1, deflection coils 32 deflect the electron beam 8 to trace a television-type raster on a target 1. The deflection coil 32 is connected to a line-scan deflection circuit 33 and to a frame-scan deflection circuit 35. At the two edges of the target 1 are electrodes 2 and 3 arranged perpendicular to the line-scan direction and are connected via a differential amplifier 9 to a pulse-shaper 42. One electrode 2 has a central portion which is about twice as wide as the rest of the electrode.

The line-scan synchronising signal contained in the video signal is supplied to a pulse-shaper 46 via a connection 48. The frame-scan synchronising signal, likewise contained in the video signal, is supplied to a pulse-shaper 47 via a further connection 49. The pulse-shapers 46 and 47 each contain two logic circuits 37 and 39, and 38 and 40. One output of each of the pulse shapers 42 and 46 is taken to an input of a comparator circuit 44, and an additional output of the pulse-shaper 42 and an output of the pulse-shaper 47, are taken to an input of a further comparator device 45. The output of the comparator devices 44 and 45 are connected to respective inputs of the line-scan and frame-scan deflection circuits 33 and 35. The inputs of the line-scan and frame-scan deflection circuits 33 and 35 are also connected to the terminals 48 and 49 for receiving the line-scan and frame-scan synchronising signals contained in the video signal. For the purpose of supply of auxiliary signals, the output of the logic circuit 37 of pulse-shaper 46, is connected to the pulse-shaper 42 and to the comparator circuit 44, whilst the output of the logic circuit 38 is connected to the comparator device 45 and the frame deflection circuit 35 is connected to the logic circuit 39.

The system shown in FIG. 1 controls the raster position and size traced out on the target 1, but where more than one target is employed as in colour systems, separate systems are employed for controlling the raster position and size on the separate targets but there need only be one pair of logic circuits 37 and 38 which are then common to all the target layers.

The common connections to all the targets are symbolized in FIG. 1, by the use of double-headed arrows.

Figure 2:
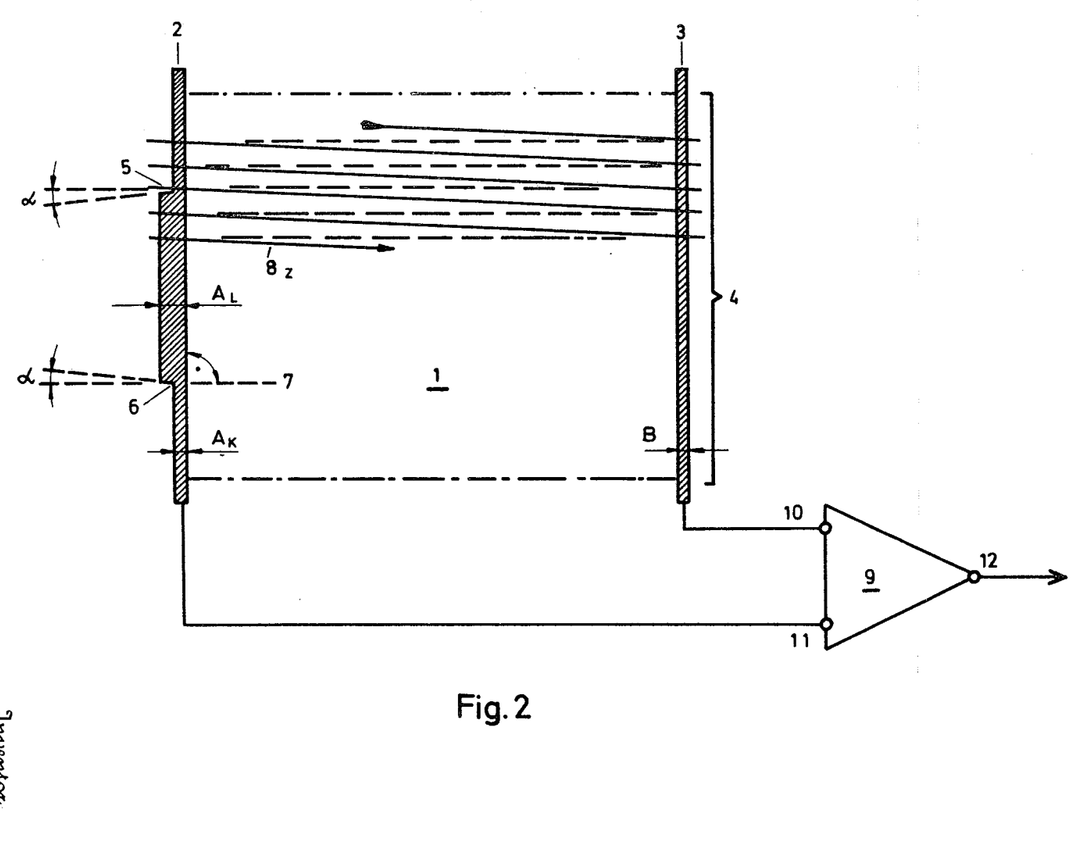
FIG. 2 is a plan view on an enlarged scale, of a target layer, having two electrodes at its edges.

In the enlarged illustration of the target 1 in FIG. 2, the two electrodes are once again marked 2 and 3. The width of the right-hand electrode 3 is marked B. The width of the left-hand electrode 2 is marked $A_K$ at the narrower part and $A_L$ at the wider part. The width $A_K$ is the same as the width B as illustrated. The broadening of the electrode 2 follows a trapezoidal profile with steps having an angle $\alpha$ to the horizontal, the steps 5 and 6 in fact preferably being disposed at about ¼ and ¾ of the frame height respectively. The angle $\alpha$ of the steps 5 and 6 is so chosen that with raster lines not running perpendicularly to the electrode 2, the formation of double pulses is avoided when the trace intersects the steps 5 and 6. By arranging the steps 5 and 6 at about ¼ and ¾ of the frame height, the raster 4, with the assistance of the circuit arrangement to be described hereinafter, is locked onto these two points in the vertical direction and any linearity errors in the raster, in the vertical sense, are distributed around these points and thus, viewed over the full frame height, yield the smallest deviations. The electrodes 2 and 3 are connected to the inputs 10 and 11 of the differential amplifier 9, the output of the latter being marked 12.

Each time the electron beam 8 passes over an electrode in the course of tracing a line $8_z$, a voltage pulse appears at the inputs 10 and 11 of the differential amplifier 9. Due to the presence of the widened portion ($A_K$) of the electrode 2, when the beam is tracing a line of the raster in this zone, the voltage pulses are lengthened.

The differential amplifier 9 eliminates parasitic signals which generally occur simultaneously at both electrodes. The voltage pulses produced by electrodes 2 and 3 appear at the output 12 of the amplifier 9 with opposite polarities, so that their separate analysis is almost as simple to carry out as when using two separate amplifiers.

Making reference to the diagrams of FIGS. 3 and 4, a description will now be given of how, in the pulse-shaper 42, line-scan and frame-scan position pulses are formed from the voltage pulses appearing at the output 12 of the differential amplifier 9.

Figure 3:
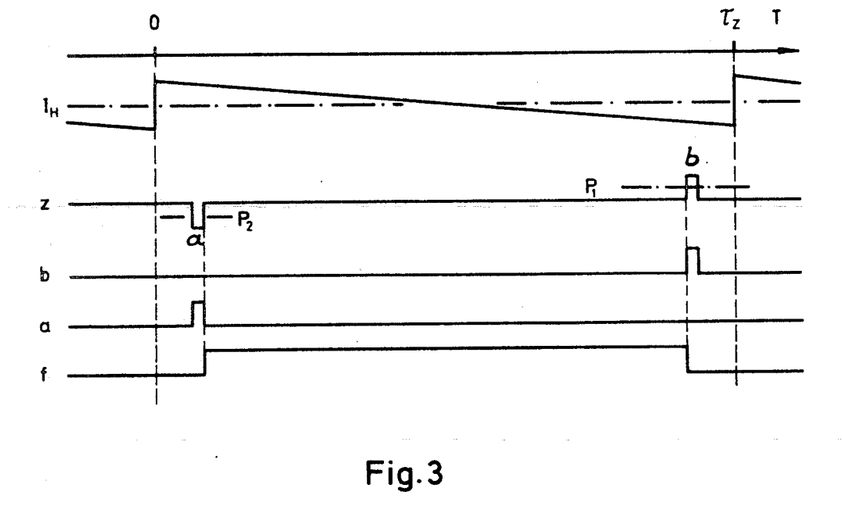
FIGS. 3 to 9, and 11, illustrate voltage-time and current-time curves as an aid in understanding the functioning of the system.
Figure 5:
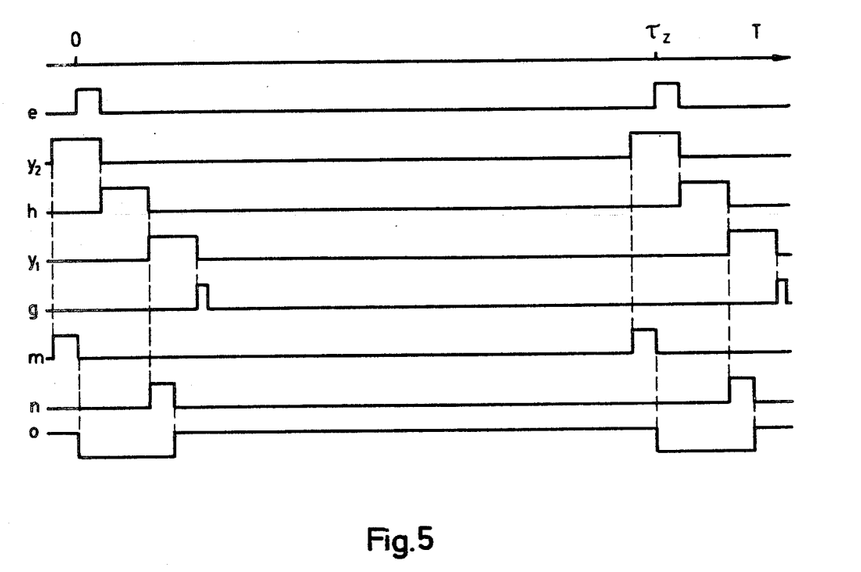

The diagrams of FIG. 3 have all been drawn to the same time scale. The time elapsing between $T=0$ and $T=T_z$, corresponds to a line-scan cycle time. The diagram $I_H$ shows the current in the horizontal deflection coil. The curve z illustrates the voltage pulses a and b appearing at the output 12 of the differential amplifier 9 (FIGS. 1 and 2). The positive pulses b originate from the right-hand frame edge electrode, and the negative ones a from the left-hand electrode. Using an amplitude filter, the positive pulses b are separated from other spurious pulses having an amplitude less than potential P1, and using a second such filter, the negative pulses a are likewise derived and have a potential in excess of the predetermined potential P2. Accordingly, the pulses a and b are available separately. From these pulses a and b, the pulses shown in diagram f are derived, the positive f pulses each commencing coincidentally with the trailing edge of an a pulse, and ending concidentally with the leading edge of the ensuing b pulse. From the circuit point of view, this can be achieved using a flip-flop device. The f pulses are the line-scan position pulses. After entering the frame, the electron beam leaves the left-hand frame edge electrode, the a pulse ends and the f pulse begins; on exit from the frame, the electron beam crosses the right-hand frame edge electrode, the b pulse begins and the f pulse ends. The a pulses can have two different durations depending on whether they are derived from the electron beam crossing the narrower or wider portion of the electrode 2. The two a pulses shown in FIG. 5 are short ones, i.e. they are the same duration as the b pulses; the diagrams of FIG. 3 cover only one line.

Figure 4:
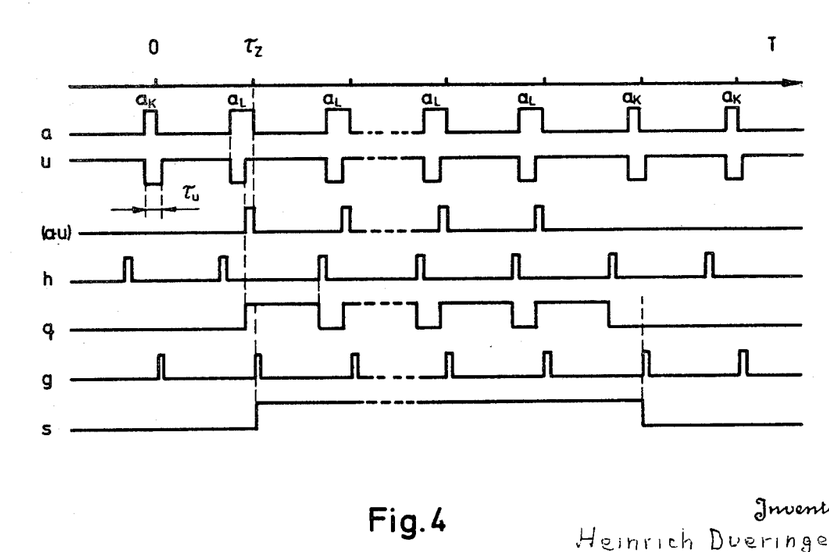

The diagrams of FIG. 4, plotted on a smaller timebase scale than those of FIG. 3, extend over several lines, including some of the lines that cross the widened portion of electrode 2. The time elapsing between $T=0$ and $T=T_z$, corresponds to the line-scan periodicity. The a pulses occur in two different lengths; the shorter $a_K$ pulses are produced by the narrower parts and the longer $a_L$ pulses by the wider parts, of the frame edge electrode 2 (FIGS. 1 and 2). The frame position pulses s are derived from the a pulses in such a way that the s pulses in each case commence concidentally with the trailing edge of the first $a_L$ pulse in the group of such pulses, and end coincidentally with the trailing edge of the first $a_K$ pulse in the ensuing group of such pulses. The production of the s pulses can, as far as the circuitry is concerned, be achieved as follows:

In the pulse-shaper 42, the leading edge of each a pulse ($a_K$ and $a_L$ pulses) triggers a monostable multivibrator of time constant $T_u$, which produces output pulses u. The time $T_u$ is so chosen that the u pulses are longer than the $a_K$ pulses but shorter than the $a_L$ pulses. The pulses a ($a_K$ and $a_L$) and u, are supplied to the inputs of an AND-gate, at the output of which the pulses ($a.u$) appear. The ($a.u$) pulses thus only appear when the $a_L$ pulse (long a pulse) occurs in the combination. The ($a.u$) pulses drive the output of a first flip-flop device positive, said output on the other hand being zeroed again at the end of each line, by a first line-scan frequency auxiliary signal h. The resultant output signal q programmes the input of a second flip-flop device. A second line-scan frequency auxiliary signal g lagging the auxiliary signal h, transfers the input state q of said flip-flop device to its output, at the commencement of a line. At the output of this flip-flop device, the frame positioned pulses s appear.

The above-described arrangement for producing the ($a.u$) pulses, avoids any integrating operations and therefore makes it possible to use standard digital circuitry.

From the synchronizing signals e, v of the video signal, the pulse-shapers 46 and 47 form line-scan and frame-scan reference pulses respectively, and these are likewise supplied to the comparator devices.

In order to avoid alignment errors in colour systems using three targets, the physical dimensions of the three targets, with their frame edge electrodes, and the optical accuracy of the three optical systems for focussing the separate colour images derived from a multi-coloured image onto the three targets must either be identical with one another or be adjustable. This applies also to the relative angular positions of the three target layers. Thus, instead of using complex mechanical adjusting devices in such a colour system, the three targets are allocated individually adjustable reference pulses. In practice, only a relatively narrow range of adjustment vis-a-vis the overall reference pulse periodicity, is required. Because heat and ageing factors affecting the operation of the individual reference pulse generators over a period of time can give rise to alignment errors, the reference pulses are made up of main reference pulses common to all the targets and auxiliary reference pulses formed separately in respect of each target. In order to be able to separately regulate the raster geometry at each edge of the frame, each main reference pulse is preceded and followed by an auxiliary reference pulses. The stability requirement imposed upon the auxiliary reference pulse generator is less stringent than the requirement obtaining in an arrangement not using split reference pulses, this to the extent of the ratio of the main reference time to the auxiliary reference time.

Making reference to the diagrams shown in FIGS. 5 and 6, a description will now be given which illustrates how, in the pulse shapers 46 and 47, the reference pulses are developed from the synchronizing signals contained in the video signal.

The diagrams illustrated in FIG. 5, are all plotted on the same timebase scale and illustrate the formation of the line-scan reference pulses. The time elapsing between $T=0$ and $t=T_z$, corresponds to the line-scan periodicity. The diagram $e$ illustrates the line-scan synchronizing signal. From the $e$ signal, the signal $y_2$ shown in the diagram is derived in such a way that it leads the $e$ signal and thus occurs at the end of a line. From the $y_2$ signal, the signal $h$ depicted in the $h$ diagram is derived in such fashion that the trailing edge of the $y_2$ signal coincides with the leading edge of the $h$ signal. The $y_1$ signal shown in the diagram is derived from the $h$ signal in such a fashion that the trailing edge of the $h$ signal coincides with the leading edge of the $y_1$ signal. The auxiliary signal $g$ illustrated in the diagram is derived from the $y_1$ signal in such fashion that the trailing edge of the $y_1$ signal coincides with the leading edge of the $g$ signal. The time elapsing between the leading edge of the $y_1$ signal occurring at the commencement of the line, and the leading edge of the $y_2$ signal located at the end of the line, defines the main reference time. The leading edge of the $y_1$ signal starts the $n$ signal illustrated in the diagram, and the leading edge of the $y_2$ signal starts the $m$ signal shown in the diagram. The line-scan reference pulse $o$ illustrated in the diagram, is started by the trailing edge of the $m$ signal and reset to zero by the trailing edge of the $n$ signal. The $m$ and $n$ signals are the auxiliary reference pulses. The duration of the signals $y_1$, $h$, $y_2$, $m$ and $n$, is determined in each case by virtue of the fact that the time of the line-scan reference pulse $o$ coincides with the time of the line-scan position pulses $f$ (FIG. 3), at the theoretical line position. The pulse duration of the $g$ signal is not critical and in practice will amount to some few percent of the line-scan periodicity.

Figure 6:
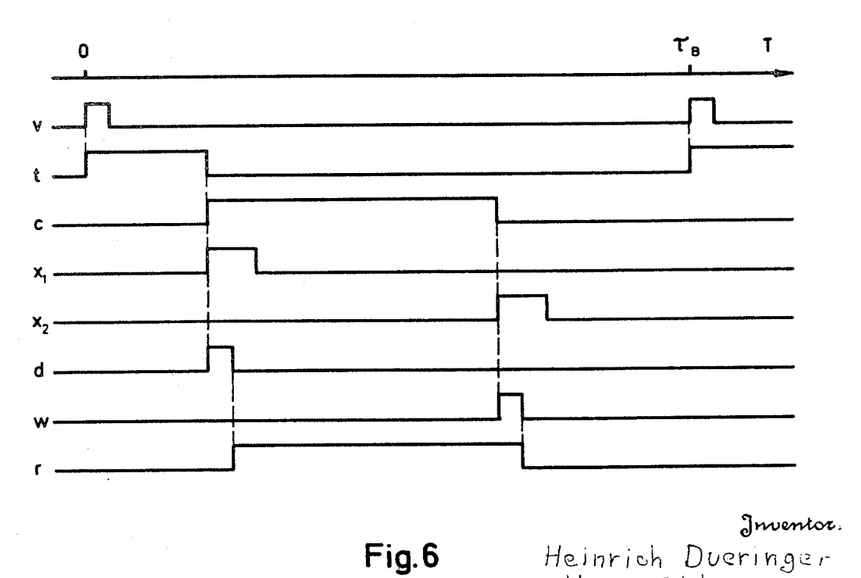

In accordance with FIG. 6, in a similar fashion the frame reference pulse $r$ plotted in the diagram, is derived from the frame synchronising signal $v$ plotted in the diagram. All the diagrams have again been plotted on the same timebase scale, and the time elapsing between $T=0$ and $t=T_B$, corresponds to the frame-scan periodicity. The leading edge of the frame-scan synchronising signal $v$, triggers the $t$ signal plotted in the diagram. The trailing edge of the $t$ signal triggers the $c$ signal plotted in the diagram. The leading edge of the $c$ signal triggers the $x_1$ signal plotted in the diagram and the trailing edge of the $c$ signal triggers the $x_2$ signal plotted in the diagram. The leading edge of the $x_1$ signal starts the auxiliary reference pulse $d$ plotted in the diagram, and the leading edge of the $x_2$ signal triggers the auxiliary reference pulse $w$ plotted in the diagram. The trailing edge of the pulse starts the frame-scan reference pulse $r$ plotted in the diagram and the trailing edge of the $w$ pulse resets it to zero. The duration of the signals $t$, $c$, $x_1$, $x_2$, $d$ and $w$, is determined in each case by the fact that the duration of the frame-scan reference pulses $r$ coincides with the duration of the frame position pulses $s$ (FIG. 4) at the theoretical frame position.

A circuit arrangement for forming the reference pulses illustrated in FIGS. 5 and 6, can be made up for example of monostable multivibrators and flip-flop devices.

By adjusting the length of the auxiliary reference pulses, the raster can be displaced vis-a-vis the top and bottom steps 5 and 6 of the left-hand frame edge electrode, and also in relation to the left-hand and right-hand electrodes, these displacements being independent of one another, and in this way the three rasters of the individual targets can be aligned with one another. Also, the lengths of the $m$ and $n$ pulses (FIG. 5) can be individually modulated by variable frame-scan frequency sawtooth voltages, and in this way a vertical trapezoidal distortion produced in the raster. This serves to compensate for alignment errors arising out of mechanical and optical trapezoidal distortion effects.

The comparator devices 44 and 45 form correcting signals from the pulses supplied by the three pulse-shapers 42, 46 and 47 which correcting signals are fed into the deflection and centering circuits 33, 35 in order to correct raster positon and size. The correcting signals regulate the raster position and size until the time function of the position pulses corresponds with that of the reference pulses, thus reducing the correcting signal to zero again.

Figure 7:
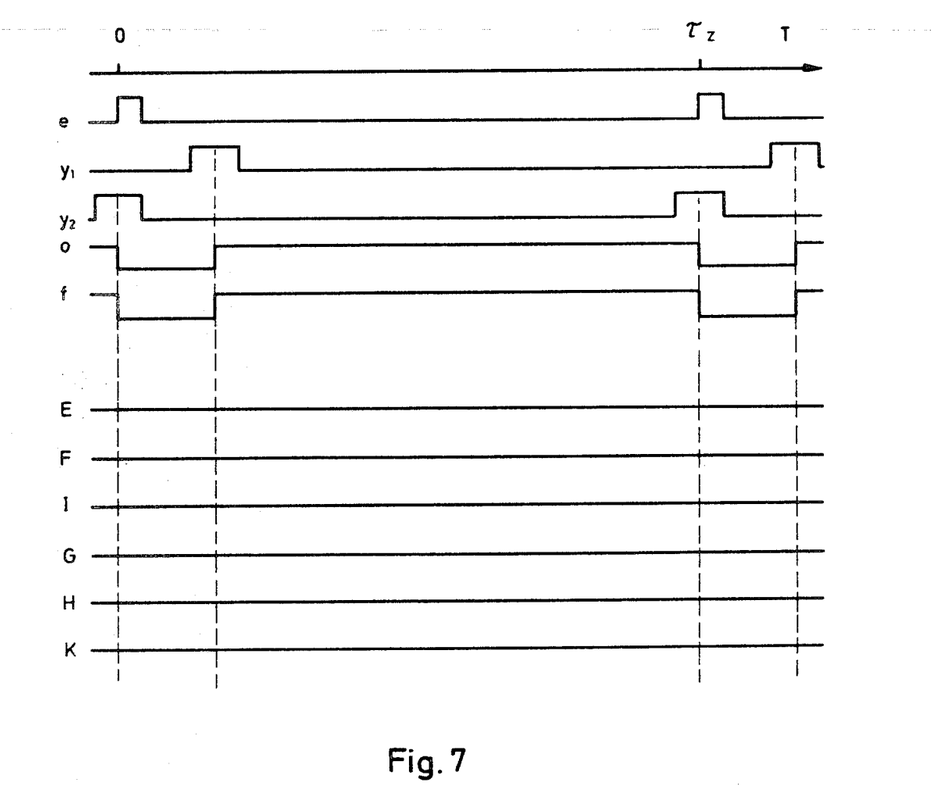

Making reference to the diagrams of FIGS. 7 to 9, the function of the comparator device 44 will now be explained. The time elapsing between $T=0$ and $T=T_z$, once again corresponds to the line-scan periodicity. In FIG. 7 the line-scan synchronizing pulses $e$ are illustrated. In the $y_1$ and $y_2$ diagrams, the auxiliary signals $y_1$ and $y_2$ supplied by the pulse-shaper 46, have been shown (see diagrams of FIG. 5). In the $o$ diagram, the line-scan reference pulses $o$ (see diagram of FIG. 5) supplied by the pulse-shaped 46, have been shown, and in the $f$ diagram the line-scan position pulses $f$ (see diagram of FIG. 3) supplied by the pulse-shaper 42. In the E, F, G and H diagrams, the error pulses resulting from the following logic combinations, have been shown:

$$E = y_1.o.\bar{f} + y_2.o.\bar{f}$$
$$F = y_1.\bar{o}.f + y_2.\bar{o}.f$$
$$G = y_1.\bar{o}.f + y_2.o.\bar{f}$$
$$H = y_1.o.\bar{f} + y_2.\bar{o}.f$$

$\bar{o}$ and $\bar{f}$ are inverted $o$ and $f$ pulses respectively. The I and K diagrams illustrate the correcting signals I and K formed from the error pulses. In order to form the I signal the E and F pulses are integrated with opposite polarities, in an integrator device, at the output of which latter the I signal appears. In order to form the K signal, in a further integrator the G and H pulses are integrated with opposite polarities, and the result is the K signal.

In accordance with FIG. 7, the length and position of the $o$ and $f$ pulses, are identical; in accordance with the aforestated logic combination, therefore, the E, F, G and H pulses are zero. Likewise, the correcting signals I and K are zero. The position of the lines of the raster corresponds with the theoretical.

Figure 8:
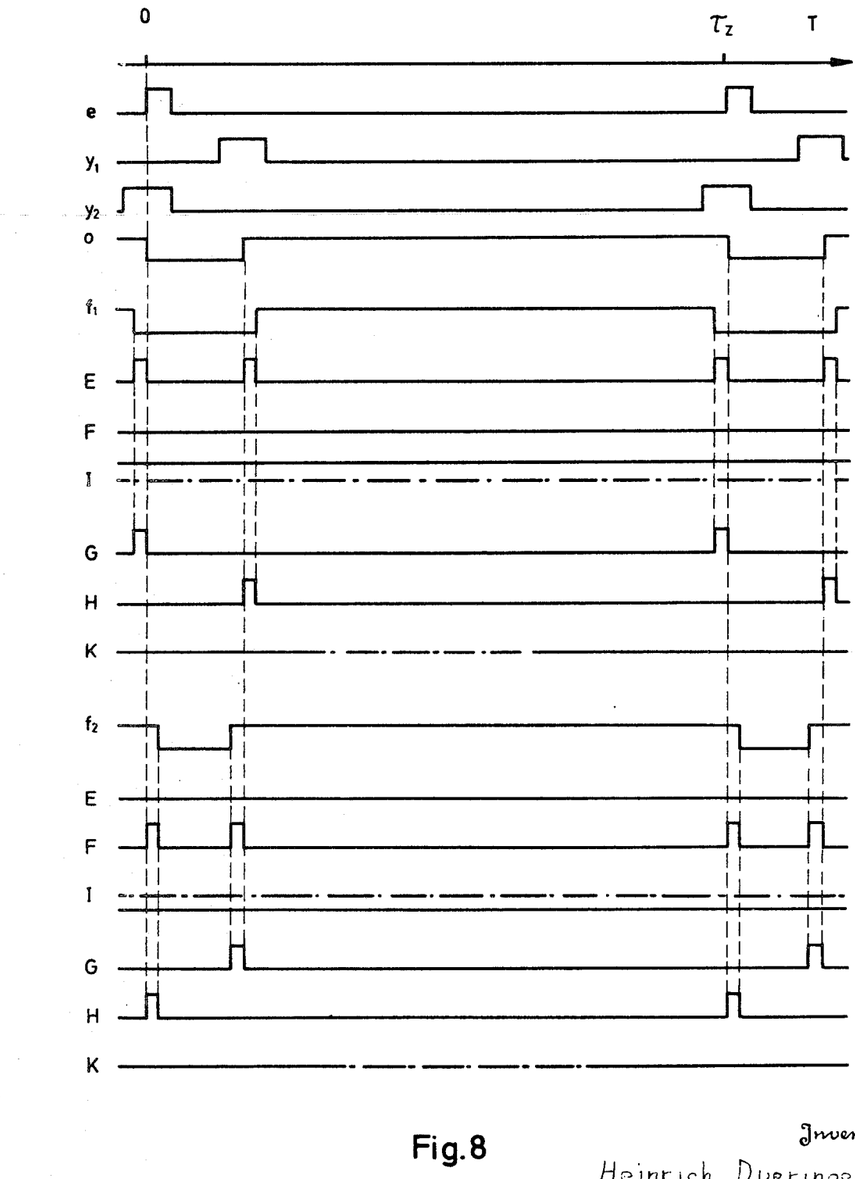
Figure 9:
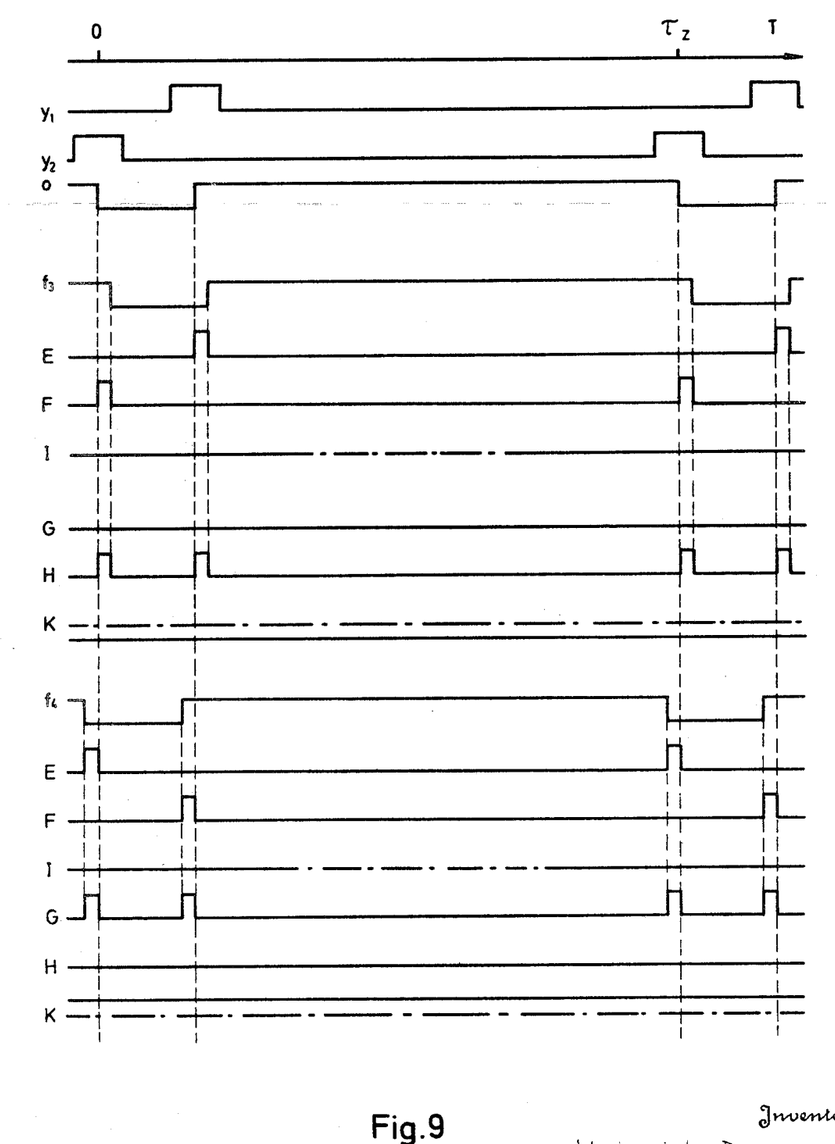

In the diagrams of FIGS. 8 and 9, the following four special cases have been illustrated:

(a) Raster width too large, position error zero.
   Consequence: Positioning pulse $f_1$.
(b) Raster width too small, positional error zero.
   Consequence: Positioning pulse $f_2$.
(c) Raster width correct, raster offset too far to the left.
   Consequence: Positioning pulse $f_3$.
(d) Raster width correct, raster offset too far to the right.
   Consequence: Positioning pulse $f_4$.

In accordance with the logic combinations referred to earlier on, for the three cases picked out above, the corresponding error pulses E, F, G and H are formed, as illustrated in the diagrams E, F, G and H; these signals have been shown in each case beneath the associated positioning pulses $f_1$, $f_2$, $f_3$ and $f_4$. The resultant correcting signals I and K, have been plotted in the diagrams. In case (a), the I signal is positive and drives the deflection generator in the direction towards smaller raster size. The length of the G and H pulses are the same and the correcting signal K is zero. In the case (b), the I signal is negative and drives the deflection generator in the direction towards larger raster size; the $k$ signal remains at zero. In the case (c), the K signal is negative and modifies the centering current in such a way as to cause displacement of the raster towards the right; the lengths of the E and F pulses are the same so that the correcting signal I is zero. In the case (d), the K signal is positive and modifies the centering current so that the raster is displaced towards the left; the lengths of the E and F pulses are the same, the correcting signal I is therefore zero.

Self-evidently, intermediate values and combinations of the four cases shown in FIGS. 8 and 9, can occur.

Figure 10:
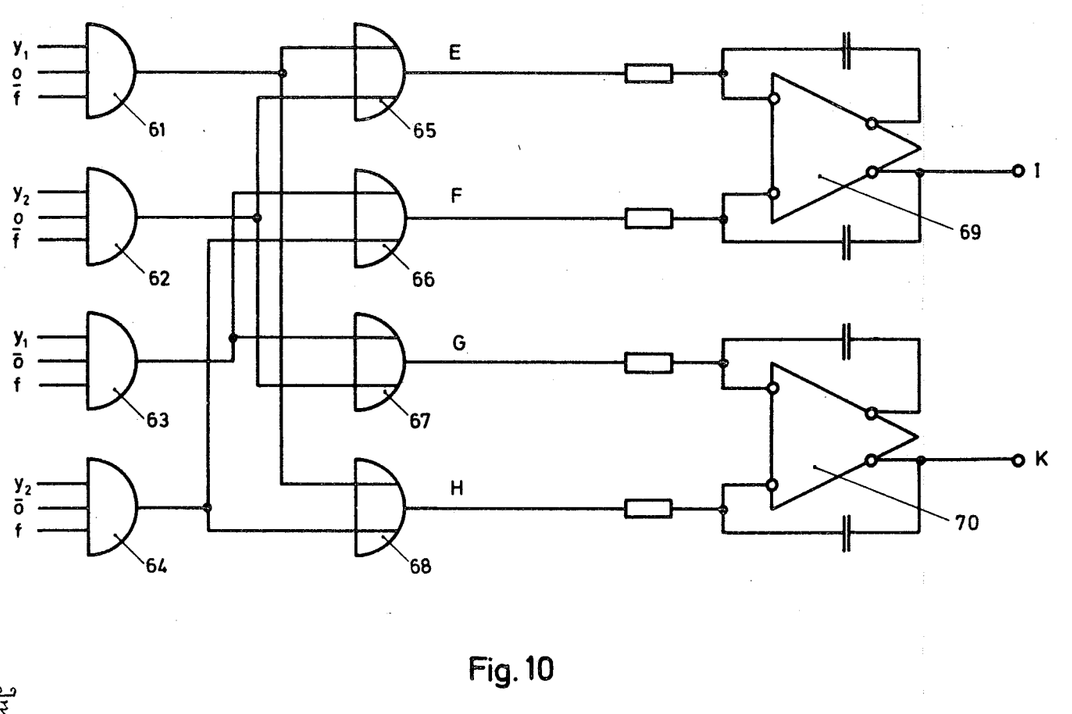
FIG. 10 shows a part of the system of FIG. 1.

In FIG. 10, a preferred embodiment of the comparator device 44 (FIG. 1) for forming the correcting signals 1, K has been illustrated in the form of a block diagram. The logic combinations of signals shown in FIG. 7, are brought about using AND-gates 61, 62, 63 and 64 and OR-gates 65, 66, 67 and 68. The AND-gates have three inputs and the OR-gates two inputs. To the inputs of the AND-gate 61, the $y_1$, $o$ and $\bar{f}$ pulses are applied and to those of the AND-gate 62, the $y_2$, 0 and $\bar{f}$ pulses. The inputs of the AND-gate 63 are supplied with the $y_1$, $\bar{o}$ and $f$ pulses, and those of the AND-gate 64 with $y_2$, $\bar{o}$ and $f$ pulses. The output of the AND-gate 61 leads in each case to an input of the OR-gates 65 and 68, the output of the AND-gate 62 in each case to an input of the OR-gates 65 and 67. The output of the AND-gate 63 is connected to an input of each of the OR-gates 66 and 67 and the output of the AND-gate 64 likewise to an input of each of the OR-gates 66 and 68. The outputs E and F of the OR-gates 65 and 66 are each taken to an input of a differential amplifier 69 connected to operate as an integrator, at the output of which the correcting signal I appears. The outputs G and H of the OR-gates 67 and 68, are each connected to an input of a further differential amplifier 70 connected to operate as an integrator, at the output of which the correcting signal K appears.

In the arrangement of FIG. 10, the integrating amplifiers 69, 70 are supplied with the digitally produced error pulses, whose length corresponds with the residual error occurring in a control system. Any influencing e.g. of thermal origin, of the amplitude of the error pulses thus simply corresponds to a change in the control circuit gain and this has no disturbing effect provided that the overall gain of the control system is sufficiently high. An amplitude error produces no correcting signal as far as the raster position is concerned. A positional error produces no correcting signal as far as the raster size is concerned.

The size and position of the raster in the vertical sense, are regulated in a similar way to that used in respect of the horizontal. The comparator device 45 (FIG. 1) similar in design to the one shown in FIG. 10, is supplied with the frame-scan frequency pulses $x_1$, $x_2$, $r$, $\bar{r}$, $s$ and $\bar{s}$ (FIG. 6). In the analogy between the devices 44 and 45, the following correspond to one another: $y_1 \sim x_1$, $y_2 \sim x_2$, $o \sim r$, $\bar{o} \sim \bar{r}$, $f \sim s$ and $\bar{f} \sim \bar{s}$. The frame-scan correcting signal must control the size and position of the raster in the vertical sense.

At the time of switch-on, it may happen that the horizontal raster size is so small, or the raster so far off-centre, that the electron beam produces a trace which intersects only one frame edge electrode, or for that matter neither of them, so that no $a$ or $b$ pulses are produced (FIG. 3). In accordance with a preferred feature of the invention, in the absence of $a$ or $b$ pulses, the horizontal position pulse $f$ is given a predetermined time function such that the requisite direction of control, i.e. towards larger horizontal raster size, or shift of the raster in the direction toward the frame edge electrode over which the trace is not passing, is produced. With the aid of the diagram plotted in FIG. 11, on the same timebase scale as FIG. 3, the mode of operation of the system will now be explained in greater detail.

Figure 11:
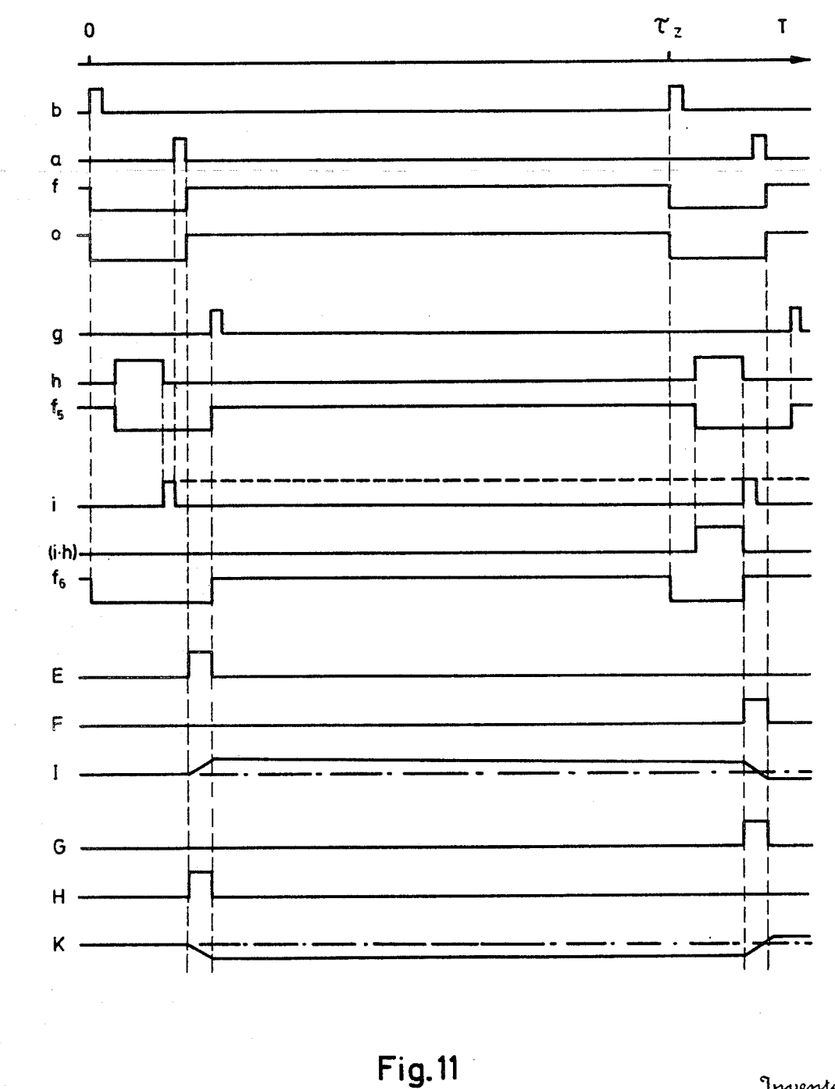

In FIG. 11, the time elapsing between $T=0$ and $T=T_z$, is once again equivalent to the line-scan periodicity. The pulses $a$, $b$, $f$ and $o$ correspond to the pulses shown in FIGS. 3 and 5, when raster size and position are correct. The formation of the auxiliary signals $g$ and $h$ has already been described in relation to FIG. 5. In the absence of $a$ and $b$ pulses, the position pulse $f$ is affected by the auxiliary signals $g$ and $h$ which follow the $a$ and $b$ pulses, so that the pulse $f_5$ is produced. The leading edge of the $g$ pulse starts the $f_5$ pulse and the leading edge of the $h$ pulse ends it. An analysis of the $f_5$ pulse shows that because of the absence of any $a$ pulses, control would tend to take place in the wrong direction. The pulse $f_6$ illustrates the formation of the $f$ pulse as a consequence of the absence of the first $a$ pulse. The error pulses E, F, G and H occur in accordance with FIG. 8, and in this particular case it is the E and H pulses which appear and therefore give rise to a positive correcting signal I. The result of this, in accordance with special case (a) described hereinbefore in relation to FIG. 8, is a further reduction in the raster size. The K signal becomes negative and, again in accordance with the special case (c) described hereinbefore in relation to FIG. 9, a shift in the raster towards the right takes place, i.e. in a direction further away from the frame edge electrode which should be producing the $a$ pulse. This incorrect control function as a consequence of the absence of the first $a$ pulse, cannot be avoided. Nevertheless, because of the absence of an $a$ pulse, in the immediately succeeding line the requisite $f$ pulse duration is maintained; the $i$ signal illustrated in FIG. 11, commences with the trailing edge of the $h$ signal and ends with the leading edge of the $a$ pulse. Because of the absence of any $a$ pulses, the $i$ signal (shown in broken-line) does not disappear after all. By logic combination of the $i$ and $h$ signals, the $(i.h)$ signal illustrated in the $(i.h)$ diagram, appears. If there is an $i$ signal in existence, then the $(i.h)$ signal commences with the leading edge of the $h$ signal, and ends with the trailing edge of same. The positioning pulse $f_6$ commences with the leading edge of the auxiliary signal $g$ and ends with the leading edge of the $b$ pulse; in the presence of a $(i.h)$ signal, the $f_6$ pulse, however, starts as soon as the trailing edge of the $(i.h)$ signal appears, and due to logic combination with the reference pulse $o$, the error pulses F and G illustrated in the right-hand half of FIG. 11 are produced, and from these the correcting signals I and K which cause control to be effected in the requisite direction. As soon as the electron beam traces over the frame edge electrode again, the $a$ pulses appear, the $(i.h)$ signal disappears and the position pulses $f$ are controlled by the trailing edges of the $a$ pulses. A circuit arrangement incorporated in the pulse-shaper 42, in order to produce the pulses shown in FIG. 11, can for example be constructed using flip-flop devices and AND-gates.

What is claimed is:

1. A system for stabilizing the position and size of a raster scanned by an electron beam on a target comprising a target having thereon two electrodes in parallel spaced apart relationship, one of said electrodes having two portions of different widths; line-scan and frame-scan circuits for scanning the electron beam over the target to form a raster which overlaps the electrodes thereby causing pulses to be produced thereat; a first signal-shaper coupled to said electrodes and arranged to select groups of pulses which include pulses produced by the beam scanning over one of said two portions of said one electrode, said first signal-shaper being further arranged to form from the pulses supplied by the two electrodes during a line scan, a line position signal significant for the actual position of the line scan and the actual line-scan time between the two electrodes, and also, with the scanning of each frame, to form a frame position signal significant for the actual position of the selected pulse group and for the actual time between the first and last pulses in the selected pulse group; a second signal-shaper arranged to form from line synchronizing pulses of a video signal, line-scan reference signals significant for the theoretical position and theoretical time of line scan between the two electrodes; a third signal-shaper arranged to form, during the scanning of each frame, from frame synchronizing pulses of said video signal, a frame reference signal significant for the theoretical position and theoretical time of frame scan between the transitions having a sharply defined angle between the narrower and wider portions of the one of said electrodes; and means for producing correcting signals from said signals produced by the first, second and third signal-shapers for application to the line and frame scan circuits to stabilize the horizontal and vertical position and size of the raster on said target.

2. A system as claimed in claim 1, in which only one of the two electrodes has a single portion of enlarged width disposed about the center of the raster.

3. A system for stabilizing the position and size of a raster scanned by an electron beam on a target comprising a target having thereon two electrodes in parallel spaced apart relationship, one of said electrodes having two portions of different widths; line-scan and frame-scan circuits for scanning the electron beam over the target to form a raster which overlaps the electrodes thereby causing pulses to be produced thereat; a first pulse-shaper coupled to said electrodes and arranged to select groups of pulses which include pulses produced by the beam scanning over one of said two portions of said one electrode, said first pulse-shaper being further arranged to form from the pair of pulses supplied by the two electrodes during a line scan, a line position pulse the length of which corresponds to the interval between the pulses of the pair and thus to the actual line-scan time between the two electrodes, and also, during the scanning of each frame, to form a frame position pulse the length of which corresponds to the interval between the first and last pulses in the selected pulse group; a second pulse-shaper arranged to form from line synchronizing pulses of a video signal, line-scan reference pulses whose position and length coincide with the theoretical position and theoretical time of line-scan between the two electrodes; a third pulse-shaper arranged to form, from frame synchronizing pulses of said video signal, frame reference pulses whose position and length coincide with the theoretical position and theoretical length of the frame position pulses; and comparator devices for comparing the line and frame position pulses produced by the first pulse shaper with the line and frame reference pulses produced by the second and third pulse shapers respectively to produce correcting signals for application to said line and frame scan circuits to stabilize the position and size of the raster on said target.

4. A system as claimed in claim 3, in which the second and third pulse-shapers are arranged to form auxiliary reference pulses individually controllable to compensate for positional and dimensional errors in the target or electrodes.

5. A system as claimed in claim 3 in which the first pulse-shaper is arranged to simulate line-scan position pulses when the electron beam fails to cross one or both said electrodes.

6. A system as claimed in claim 4 including a differential amplifier coupling the electrodes to the first pulse shaper.

7. A system as claimed in claim 3, in which only one of the two electrodes has a single portion of enlarged width disposed about the centre of the raster.

8. A system as claimed in claim 7, in which the length of the single portion of the electrodes is half the raster height.

9. A system as claimed in claim 7 in which the angular transitions between the narrower and wider portions of the electrode are inclined in relation to the line-scan direction.

References Cited

UNITED STATES PATENTS

| | | | |
|---|---|---|---|
| 3,182,224 | 5/1965 | Stone et al. | 315—21 |
| 3,389,294 | 6/1968 | Shaw | 315—19 |
| 3,447,026 | 5/1969 | Townsend | 315—21 |

RICHARD A. FARLEY, Primary Examiner

U.S. Cl. X.R.

315—21, 24